UNITED STATES PATENT OFFICE.

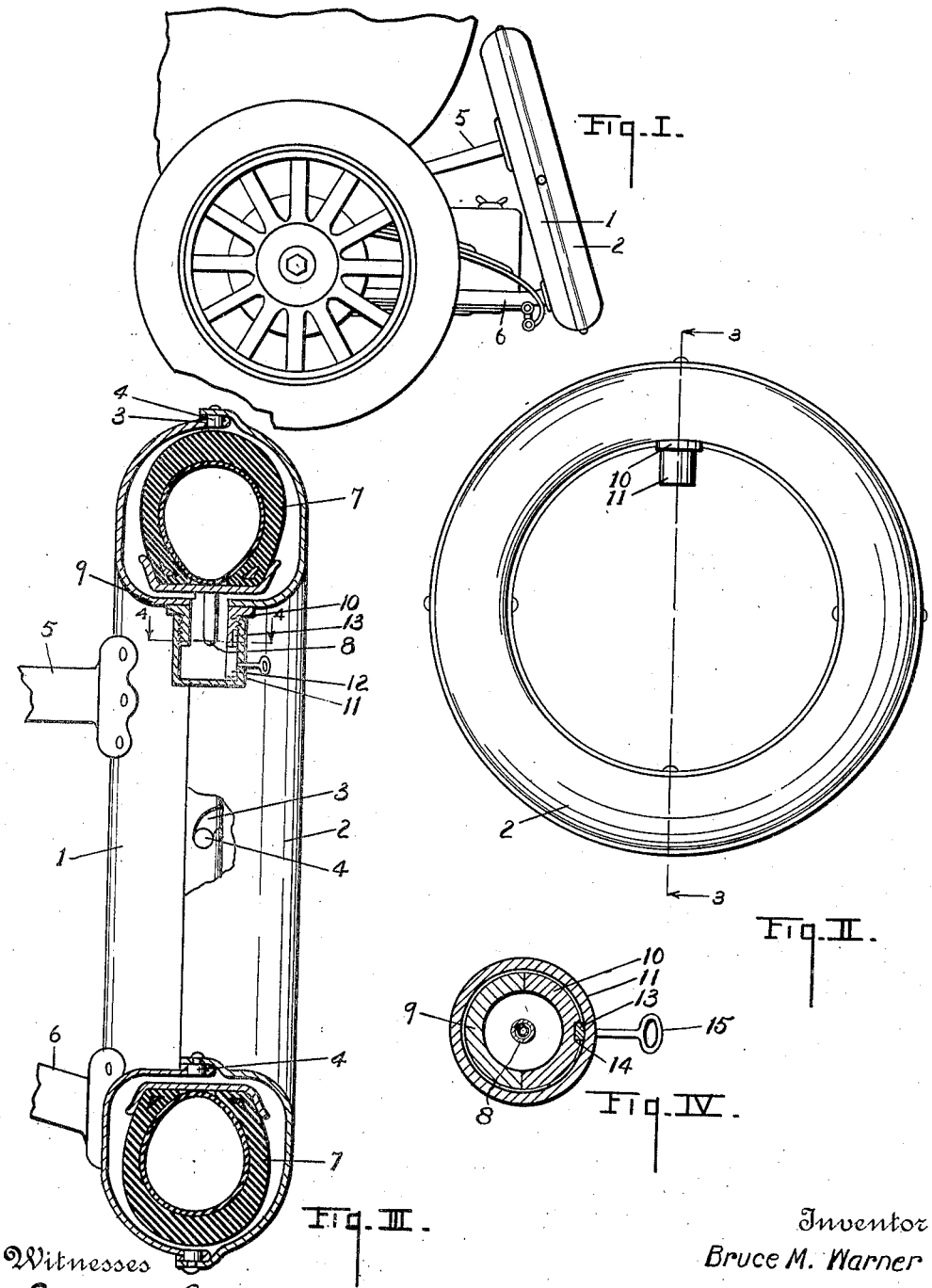

BRUCE M. WARNER, OF JACKSON, MICHIGAN.

TIRE-HOLDER.

1,387,525.   Specification of Letters Patent.   Patented Aug. 16, 1921.

Application filed January 16, 1920. Serial No. 351,866.

*To all whom it may concern:*

Be it known that I, BRUCE M. WARNER, a subject of the King of Great Britain, residing at Jackson, county of Jackson, State of Michigan, have invented certain new and useful Improvements in Tire-Holders, of which the following is a specification.

This invention relates to improvements in tire holders.

The main objects of this invention are:

First, to provide an improved tire holder or carrier adapted to be mounted upon a motor vehicle.

Second, to provide an improved tire holder or carrier in which the tire is entirely inclosed or incased.

Third, to provide an improved tire holder or carrier having these advantages which may be quickly opened and closed for the removal or insertion of a tire, and one in which the casing is locked securely.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Figure I is a detail side elevation of a motor vehicle having one of my improved tire carriers or holder mounted thereon.

Fig. II is a rear view.

Fig. III is a vertical central section on a line corresponding to line 3—3 of Fig. II, a tire being shown within the holder or carrier.

Fig. IV is an enlarged detail section on a line corresponding to line 4—4 of Fig. III.

In the drawing similar reference characters refer to similar parts throughout the several views, and the sectional views are taken looking in the direction of the little arrows at the ends of the section lines.

Referring to the drawing, my improved tire holder or carrier comprises a pair of complementary annular casing members 1 and 2 having telescoping edges as clearly shown in Fig. III. The casing members are provided with coacting joint members consisting in the structure illustrated of the bayonet joint slots 3 in the inner member and the coacting inwardly projecting pins 4 in the outer member. These joint members are engaged and disengaged by a slight rotative movement of one casing member relative to the other. The inner casing member is preferably provided with supporting brackets 5 and 6 adapted to mount the carrier at the rear of a vehicle as shown in Fig. I.

The casing is adapted to receive and inclose a tire as 7. To accommodate the stem and the stem cap 8 of the tire inclosed within the casing, I provide the casing members with nipple members 9 and 10, the nipple member 9 being mounted on the inner casing member and the nipple member 10 being mounted on the outer casing member so that when the parts are adjusted to engage their joint members, these nipple members are opposed as shown in Fig. III and Fig. IV, so that the cap 11 may be threaded thereon.

This cap serves as a locking means for the casing member joints. The cap is itself provided with a lock 12 having a bolt 13 adapted to engage a notch-like keeper 14 in the nipple section 10. A key 15 is shown for operating this lock. The joints of the casing members are by this simple means securely locked so that the unauthorized removal of a tire is prevented.

My improved tire carrier has the advantage of entirely inclosing or incasing a tire, may be made of light material and at the same time is rigid and durable. It is very easily opened and closed.

I have illustrated and described an adaptation or embodiment of my invention which I believe will enable those skilled in the art to which my invention relates to embody or adapt the same as may be desired.

Having thus described my invention, what I claim as new and desire to secure by Letters Patent, is:

1. In a tire holder, the combination of a pair of annular complementary casing members having telescoping edges and coacting bayonet slot joint members adapted to be engaged and disengaged by a rotative movement of one member relative to the other, said casing members having threaded nipple members which are brought to an opposed relation when the casing member joints are engaged, said nipple being adapted to receive the stem of a tire mounted within the holder, a cap threaded upon said nipple constituting the means for preventing the disengagement of the joint, and a lock for said cap.

2. In a tire holder, the combination of a pair of annular complementary casing members having telescoping edges and coacting bayonet slot joint members adapted to be engaged and disengaged by a rotative movement of one member relative to the other, said casing members having threaded nipple members which are brought to an opposed relation when the casing member joints are engaged, said nipple being adapted to receive the stem of a tire mounted within the holder, and a member threaded upon said nipple constituting the means for preventing the disengagement of the joint.

3. In a tire holder, the combination of a pair of annular casing members having coacting joint members adapted to be engaged and disengaged by a relative rotative movement of the members, said holder having a nipple adapted to receive the valve of a tire arranged in the holder, said nipple comprising a member mounted on each casing member adapted to coact when the casing members are closed, a cap for said nipple constituting a locking means for said joint members, and a lock for said cap.

4. In a tire holder, the combination of a pair of annular casing members having coacting joint members adapted to be engaged and disengaged by a relative rotative movement of the members, said holder having a nipple adapted to receive the valve of a tire arranged in the holder, said nipple comprising a member mounted on each casing adapted to coact when the casing members are closed, and a means engaging said nipple constituting a locking means for said joint members.

In witness whereof I have hereunto set my hand and seal in the presence of two witnesses.

BRUCE M. WARNER. [L. S.]

Witnesses:
 Don T. McKone,
 A. C. French.